United States Patent
Ali et al.

(10) Patent No.: US 8,959,736 B2
(45) Date of Patent: Feb. 24, 2015

(54) SYSTEM AND METHOD FOR INSERTING RIPPLE SPRINGS

(71) Applicant: General Electric Company, Schenectady, NY (US)

(72) Inventors: Syed Wajahat Ali, Scotia, NY (US); Brock Matthew Lape, Clifton Park, NY (US); Lawrence Michael Braun, Clarence Center, NY (US)

(73) Assignee: General Electric Company, Schenectady, NY (US)

( * ) Notice: Subject to any disclaimer, the term of this patent is extended or adjusted under 35 U.S.C. 154(b) by 308 days.

(21) Appl. No.: 13/628,139

(22) Filed: Sep. 27, 2012

(65) Prior Publication Data

US 2014/0082944 A1    Mar. 27, 2014

(51) Int. Cl.
*B23P 19/04*         (2006.01)

(52) U.S. Cl.
USPC ............................................. 29/225; 29/235

(58) Field of Classification Search
CPC .... B23P 19/041; B23P 19/043; B23P 19/045; B23P 19/10; B23Q 1/287; B23Q 3/06; B23Q 7/06
USPC .............. 29/225, 238, 235, 237, 281.1, 281.5
See application file for complete search history.

(56) References Cited

U.S. PATENT DOCUMENTS

| | | | |
|---|---|---|---|
| 3,602,974 A * | 9/1971 | Koett | 29/243.5 |
| 5,325,008 A * | 6/1994 | Grant | 310/214 |
| 2003/0111912 A1* | 6/2003 | Binnard et al. | 310/12 |
| 2011/0101590 A1* | 5/2011 | Mankame et al. | 269/309 |
| 2012/0049697 A1* | 3/2012 | Andarawis et al. | 310/68 B |
| 2014/0082944 A1* | 3/2014 | Ali et al. | 29/896.9 |

* cited by examiner

*Primary Examiner* — Lee D Wilson
(74) *Attorney, Agent, or Firm* — James W. Pemrick; Ernest G. Cusick; Frank A. Landgraff

(57) ABSTRACT

A system is provided for inserting a ripple spring includes a compression board having at least one groove, and the compression board has a ramped section at one end thereof. A driver board has at least one guide rail configured to fit inside the at least one groove. An impact tool is configured to engage the driver board and apply a driving force to the driver board. The compression board is configured to at least partially retain the ripple spring and the ramped section is configured to apply a compressive force to the ripple spring as the impact tool and driver board push the ripple spring over the ramped section.

20 Claims, 5 Drawing Sheets

SYSTEM AND METHOD FOR INSERTING RIPPLE SPRINGS

BACKGROUND OF THE INVENTION

The invention relates generally to electrical machines and in particular, to a system and method for inserting ripple springs into electrical machines.

Generally, an electrical machine such as power generator or motor is routinely monitored for proper maintenance and high efficiency during operation. One of the few aspects of monitoring health of the electrical machine is inspecting stator bar windings to ensure the windings are motionless during operation of the electrical machine. Typically, an electrical machine includes a wedge system to induce a radial retaining force to a stator to facilitate reducing movement of the stator bar windings within a stator slot. Such a wedge system may also include ripple springs (e.g., top and side ripple springs) embedded in the stator winding assembly. The ripple springs are generally in a state of compression to keep the windings from moving. However, if the wedge system becomes loose, the amount of retaining force is reduced such that the stator bar windings may move during operation. Over time, the relative motion of the stator bar windings causes damage to the insulation surrounding the stator bars and a potential stator bar winding failure can occur. This may result in electrical shorts to ground, thereby, diminishing the efficiency of the machine and further decreasing the mean time between failures of the electrical machines. Accordingly, monitoring the health of the electrical machine is periodically carried out to determine if any stator bar winding movement within the stator slots exceeds predetermined tolerances.

If the wedge system (including the ripple springs) needs to be replaced, then a technician must manually remove and install a new wedge system. To reduce outage time during a maintenance event, it may be desired to leave the rotor in place. When the rotor is left in place, ripple springs can be extremely difficult to install, especially side ripple springs, because the resulting clearances lead to insufficient room for the technician to maneuver and perform the designated task. Typically, a technician would swing a mallet to drive the ripple springs into place. The clearance between the rotor and stator may only be 12 to 24 inches, and this space is too constrained for the technician to effectively swing the mallet and drive the ripple spring into the correct location.

Therefore, to replace the wedge system while the rotor is left in place, there is a continuing need for a more efficient system and method that enables a technician to replace ripple springs.

BRIEF DESCRIPTION OF THE INVENTION

According to one aspect of the invention, a system is provided for inserting a ripple spring includes a compression board having at least one groove, and the compression board has a ramped section at one end thereof. A driver board has at least one guide rail configured to fit inside the at least one groove. An impact tool is configured to engage the driver board and apply a driving force to the driver board. The compression board is configured to at least partially retain the ripple spring and the ramped section is configured to apply a compressive force to the ripple spring as the impact tool and driver board push the ripple spring over the ramped section.

According to another aspect of the invention, a system is provided for inserting a ripple spring. The system includes a compression board having two dovetail-shaped grooves, and the compression board includes a ramped section at one end thereof. A driver board has two dovetail-shaped rails, and the dovetail-shaped rails are configured to fit inside the dovetail-shaped grooves. An impact tool is configured to engage the driver board and apply a driving force to the driver board. The compression board is configured to at least partially retain the ripple spring and the ramped section is configured to apply a compressive force to the ripple spring as the impact tool and driver board push the ripple spring over the ramped section.

According to yet another aspect of the invention, a method is provided for inserting a ripple spring. The method includes the steps of providing a compression board having at least one groove, the compression board including a ramped section at one end thereof, and the ramped section is configured to apply a compressive force to the ripple spring as the ripple spring passes over the ramped section. Another step is used for providing a driver board having at least one guide rail, and the guide rail is configured to fit inside the at least one groove. Additional steps are used for providing an impact tool configured to engage the driver board and applying a driving force to the driver board, placing the ripple spring on the compression board, placing the ripple spring and compression board at least partially within a slot of an electrical machine, placing the impact tool on the driver board, and activating the impact tool to apply an impact force to the driver board and to the ripple spring. The ripple spring is driven into the slot by the impact tool, driver board and ramped section of the compression board.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific aspects/embodiments of the present invention will be described below. In an effort to provide a concise description of these aspects/embodiments, all features of an actual implementation may not be described in the specification. It should be appreciated that in the development of any such actual implementation, as in any engineering or design project, numerous implementation-specific decisions must be made to achieve the developers' specific goals, such as compliance with machine-related, system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "one aspect" or "an embodiment" or "an aspect" of the present invention are not intended to be interpreted as excluding the existence of additional embodiments or aspects that also incorporate the recited features.

Figure 1:
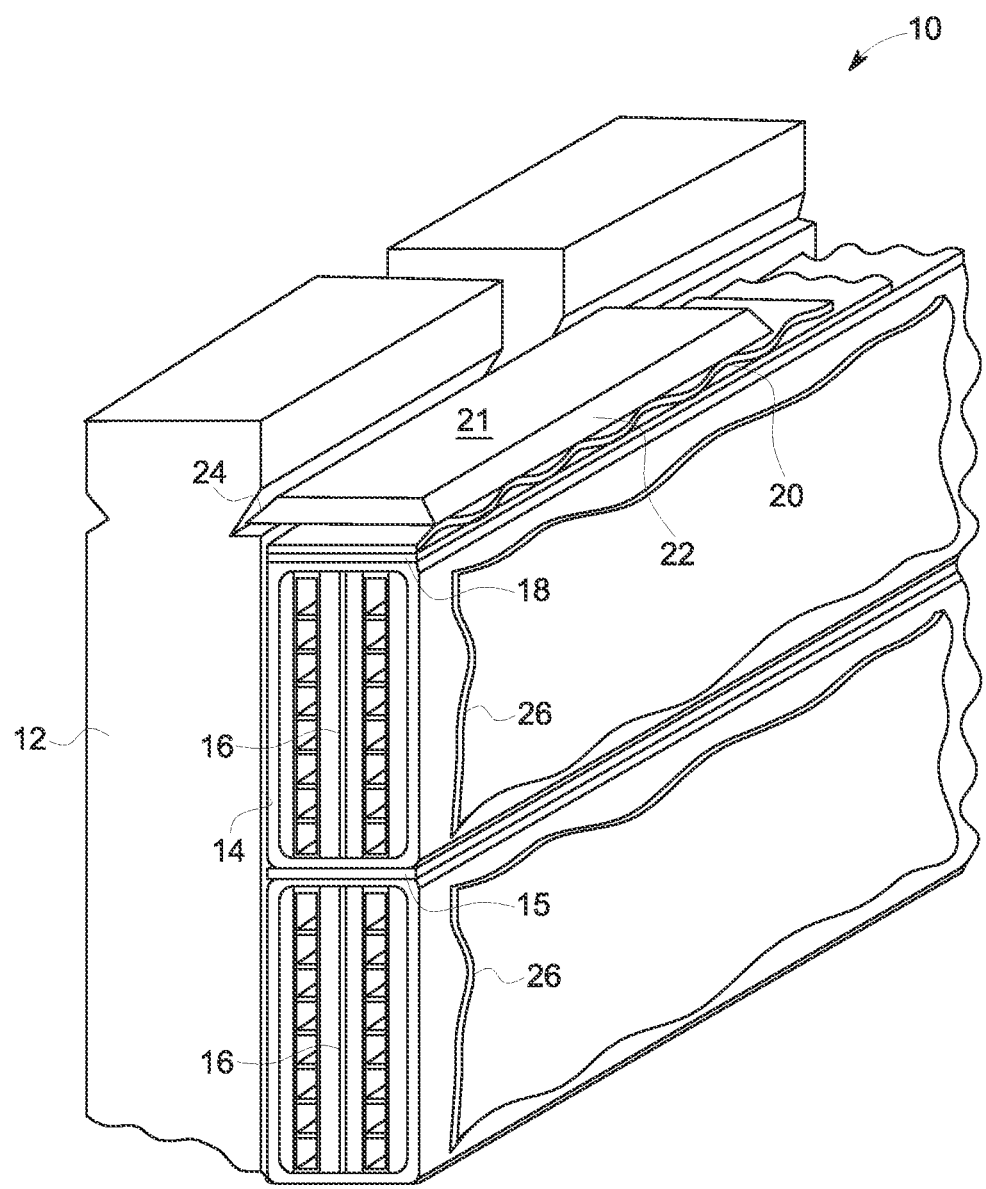
FIG. 1 is a fragmentary isometric view of a portion of the stator of an electric machine illustrating a stator wedge arrangement in accordance with an embodiment of the invention.

FIG. 1 illustrates a fragmentary, isometric view of a portion of a stator core 10 of an electrical machine having a stator wedge mechanism. The stator core 10 includes multiple stator teeth 12; which stator teeth 12 further include stator slots 14 configured to accommodate stator windings 16 (also referred to as the stator coils). The stator windings 16 are retained in the stator slots 14 by multiple elements shown as flat plates 15, shims 18, top ripple springs 20, and stator wedges 21 having beveled edges 22 for engaging correspondingly shaped grooves 24 in the sidewalls of the stator teeth 12. In various applications, the flat plate 15 may include a conductive metallic flat plate or a non-metallic flat plate (non-conductive). The top ripple springs 20 are compressed between the stator wedges 21 and shims 18 to generate a force that firmly holds the stator windings 16 in place. The top ripple spring 20 may be fabricated from a non-conductive material such as, but not limited to, a plastic laminate. The stator core 10 also includes multiple side ripple springs 26 to maintain tight fitting of the stator windings 16 within the stator core 10. The side ripple spring 26 may be fabricated from a conductive or non-conductive material such as, but not limited to, a plastic laminate or fiberglass composite.

Over time, the top ripple springs 16 and/or side ripple springs 26 may lose their resiliency so that the stator wedge system becomes loose. This can permit the stator windings 16 to vibrate, which can result in damage to the stator core 10 and eventual failure of the electrical machine.

Figure 2:
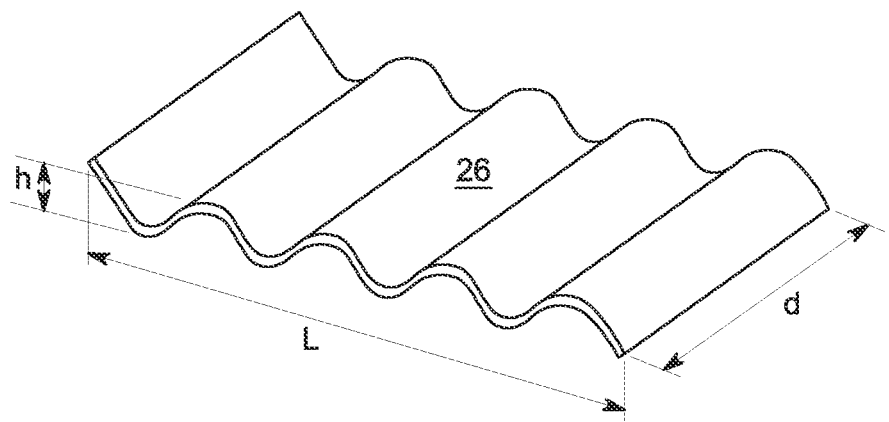
FIG. 2 illustrates a measuring system coupled to an exemplary ripple spring used within the electric machine of FIG. 1.

FIG. 2 illustrates a side ripple spring 26. As shown in an isometric view, the side ripple spring 26 has an uncompressed height h and a wave cycle travelling along the length L. However, the wave cycle may also extend in a 45 degree angle with respect to the length L, or any suitable angle as desired in the specific application. It is to be noted that the ripple spring length L and a width d are variably selected depending on the size of stator slot (shown as slot 14 in FIG. 1). In another embodiment, the side ripple spring 26 is multiple layered having a top portion layer, a middle portion layer and an oppositely disposed bottom portion layer.

Figure 3:
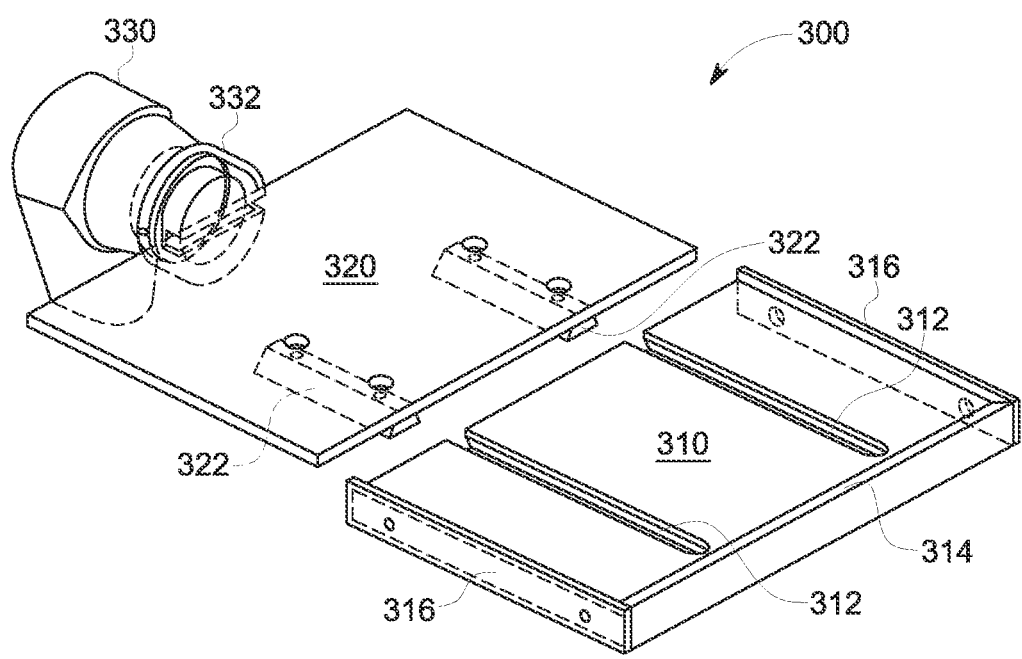
FIG. 3 illustrates an isometric view of a system for inserting a ripple spring into a slot in an electrical machine, according to an aspect of the present invention.

FIG. 3 illustrates an isometric view of a system 300 for inserting a ripple spring into a slot in an electrical machine, according to an aspect of the present invention. As one example only, the ripple spring may be a side ripple spring. The electrical machine may be a motor or a generator. The system 300 includes a compression board 310 having at least one groove 312 and a ramped section 314 at one end thereof. The groove 312 may be configured as a dovetail-shaped groove. According to one aspect of the present invention, the compression board 310 may include two or more dovetail-shaped grooves 312. The compression board 310 may also include two side rails 316 configured to support the compression board 310 in a slot of an electrical machine. The two side rails 316 also may be used to facilitate alignment of the ripple spring. As one example only, the compression board, side rails and/or ramped section 314 may be comprised of acetal resin.

A driver board 320 includes at least one guide rail 322, and the guide rail 322 is configured to fit inside the groove 312. The guide rail 322 may be configured as a dovetail-shaped rail. According to one aspect of the present invention, the driver board 320 includes two or more dovetail-shaped rails 322. As one example only, the driver board and guide rails may be comprised of acetal resin.

An impact tool 330 is configured to engage the driver board 320 and apply a driving force to the driver board 320. The impact tool 330 may be a hand-held impact hammer, hand-held (or palm) impact nailer or any other suitable tool for applying a driving force to the driver board 320. For example, the impact tool 330 may be a pneumatically powered or electrically powered impact hammer/nailer. The impact tool 330 also includes a slotted cap 332 configured to fit over a drive end of the impact tool 330. The slotted cap 332 is also configured to fit over a portion of one end of the driver board 320. As one example only, the slotted cap may be comprised of acetal resin.

Figure 4:
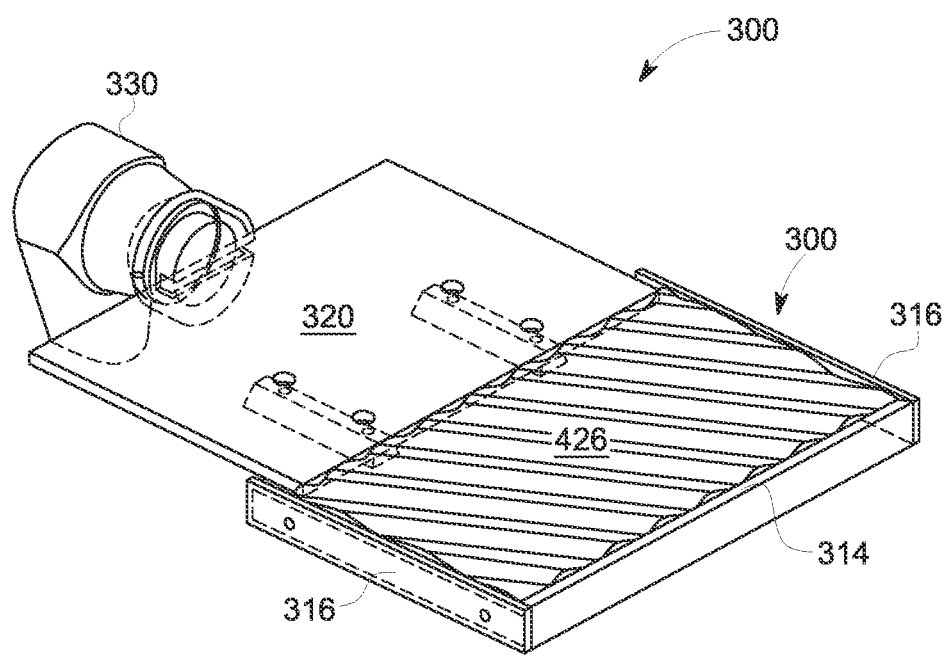
FIG. 4 illustrates an isometric view of the system, according to an aspect of the present invention.

FIG. 4 illustrates an isometric view of the system 300 and a ripple spring 426 placed on the compression board 310. In use of system 300, a ripple spring 426 is placed on the compression board 310, and the compression board 310 is configured to at least partially retain the ripple spring. For example, the ripple spring 426 may be retained by the base of compression board 310, ramped section 314, side rails 316 and/or end of drive board 320. The ramped section 314 is configured to apply a compressive force to the ripple spring as the impact tool 330 and driver board 320 push the ripple spring over the ramped section 314.

Figure 5:
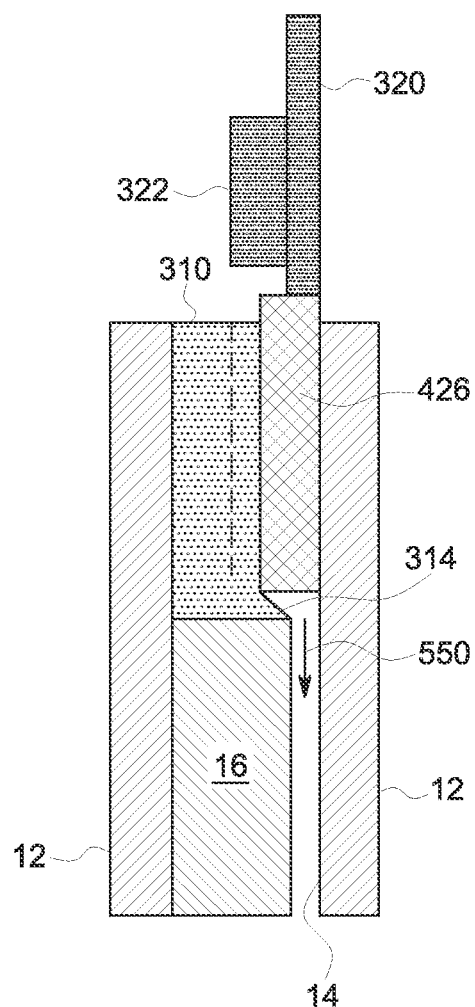
FIG. 5 illustrates a cross-sectional view of the system placed partially within a slot of an electrical machine, according to an aspect of the present invention.

FIG. 5 illustrates a cross-sectional view of the system 300 placed partially within a slot of an electrical machine. A stator winding 16 is located between two stator teeth 12 and in slot 14. A ripple spring 426 is to be inserted between stator winding 16 and opposing slot surface 14, and the ripple spring will travel in the direction indicated by arrow 550. The compression board 310 and ripple spring are placed into slot 14, and both elements rest on top of the stator winding 16. The driver board is placed on top of the ripple spring (with respect to the drawing view) and the impact tool (not shown in FIG. 5) is placed on top of the driver board 320 and used to drive the ripple spring 426 down into slot 14. The ramped surface 314 compresses the ripple spring 426 as the ripple spring passes over the ramped surface, thereby enabling the ripple spring to be inserted between the stator winding 16 and opposing surface of slot 14. After the first ripple spring is inserted, the next stator winding may be inserted and the process repeated. The side rails 316 may also be configured to be removed and attached to the compression board 310 so that various sizes of side rails may be employed to accommodate various widths of slots 14.

Figure 6:
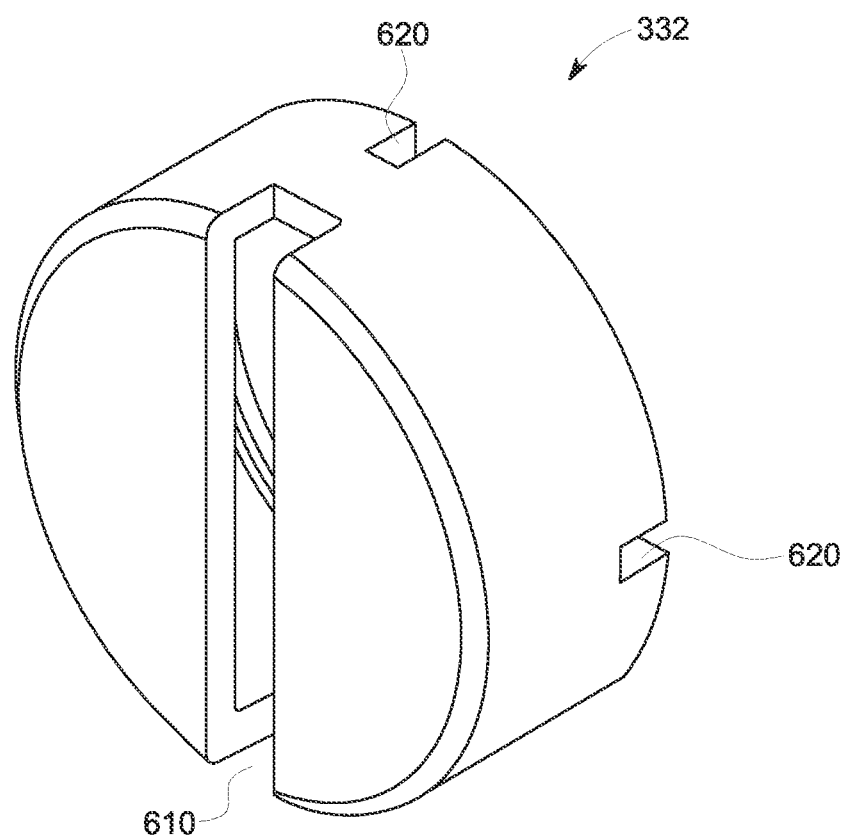
FIG. 6 illustrates an isometric view of a slotted cap, according to an aspect of the present invention.

FIG. 6 illustrates an isometric view of slotted cap 332. The slotted cap 332 includes a first slot 610 sized to accommodate and fit over driver board 320. Secondary slots 620 may be used to facilitate installation of the cap onto the impact tool 330.

According to another aspect of the present invention, a method for inserting a ripple spring is also provided. The method includes the steps of, providing a compression board having at least one groove, the compression board including a ramped section at one end thereof, the ramped section configured to apply a compressive force to the ripple spring as the ripple spring passes over the ramped section. Another step provides a driver board having at least one guide member, the guide member configured to fit inside the at least one groove. The method also includes the step of providing an impact tool configured to engage the driver board and applying a driving force to the driver board.

The method also includes the steps of, placing the ripple spring on the compression board, placing the ripple spring and compression board at least partially within a slot of an electrical machine, and placing the impact tool on the driver board. A subsequent step is used for activating the impact tool to apply an impact force to the driver board and to the ripple spring, and wherein, the ripple spring is driven into the slot by the impact tool, driver board and ramped section of the compression board. The method may also include the additional steps of providing the at least one groove as at least one dovetail-shaped groove, providing the compression board with two dovetail-shaped grooves, providing the at least one guide member as at least one dovetail-shaped member, and providing the driver board with two dovetail-shaped members. In addition, the method includes the steps of providing the compression board with two side rails configured to support the compression board in a slot of an electrical machine, wherein the two side rails are configured to facilitate alignment of the ripple spring, and providing the impact tool with a slotted cap configured to fit over a drive end of the impact tool, and the slotted cap configured to fit over a portion of one end of the driver board.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system for inserting a ripple spring into a slot in an electrical machine, the system comprising:
   a compression board having at least one groove, the compression board including a ramped section at one end thereof;
   a driver board having at least one guide rail, the at least one guide rail configured to fit inside the at least one groove;
   an impact tool configured to engage the driver board and apply a driving force to the driver board;
   wherein, the compression board is configured to at least partially retain the ripple spring and the ramped section is configured to apply a compressive force to the ripple spring as the impact tool and driver board push the ripple spring over the ramped section and into the slot of the electrical machine.

2. The system of claim 1, wherein the ripple spring is a side ripple spring.

3. The system of claim 1, wherein the at least one groove is comprised of at least one dovetail-shaped groove.

4. The system of claim 3, wherein the compression board includes two dovetail-shaped grooves.

5. The system of claim 3, wherein the compression board further comprises:
   two side rails configured to support the compression board in the slot of the electrical machine, and wherein the two side rails are configured to facilitate alignment of the ripple spring.

6. The system of claim 1, wherein the at least one guide rail is comprised of at least one dovetail-shaped rail.

7. The system of claim 6, wherein the driver board includes two dovetail-shaped rails.

8. The system of claim 1, the impact tool further comprising:
   a slotted cap configured to fit over a drive end of the impact tool, and the slotted cap configured to fit over a portion of one end of the driver board.

9. The system of claim 8, wherein the slotted cap is comprised of acetal resin.

10. The system of claim 1, wherein the compression board and the driver board are comprised of acetal resin.

11. A system for inserting a ripple spring into a slot in an electrical machine, the system comprising:
    a compression board having two dovetail-shaped grooves, the compression board including a ramped section at one end thereof;
    a driver board having two dovetail-shaped rails, the dovetail-shaped rails configured to fit inside the dovetail-shaped grooves;
    an impact tool configured to engage the driver board and apply a driving force to the driver board;
    wherein, the compression board is configured to at least partially retain the ripple spring and the ramped section is configured to apply a compressive force to the ripple spring as the impact tool and driver board push the ripple spring over the ramped section and into the slot.

12. The system of claim 11, wherein the compression board further comprises:
    two side rails configured to support the compression board in the slot of the electrical machine, and wherein the two side rails are configured to facilitate alignment of the ripple spring.

13. The system of claim 12, the impact tool further comprising:
    a slotted cap configured to fit over a drive end of the impact tool, and the slotted cap configured to fit over a portion of one end of the driver board.

14. A method for inserting a ripple spring, the method comprising the steps of:
    providing a compression board having at least one groove, the compression board including a ramped section at one end thereof, the ramped section configured to apply a compressive force to the ripple spring as the ripple spring passes over the ramped section;
    providing a driver board having at least one guide rail, the guide rail configured to fit inside the at least one groove;
    providing an impact tool configured to engage the driver board and applying a driving force to the driver board;
    placing the ripple spring on the compression board;
    placing the ripple spring and compression board at least partially within a slot of an electrical machine;
    placing the impact tool on the driver board;
    activating the impact tool to apply an impact force to the driver board and to the ripple spring;
    wherein, the ripple spring is driven into the slot by the impact tool, driver board and ramped section of the compression board.

15. The method of claim 14, further comprising:
    providing the at least one groove as at least one dovetail-shaped groove.

16. The method of claim 15, further comprising:
    providing the compression board with two dovetail-shaped grooves.

17. The method of claim 16, further comprising:
providing the compression board with two side rails configured to support the compression board in a slot of an electrical machine, and wherein the two side rails are configured to facilitate alignment of the ripple spring.

18. The method of claim 14, further comprising:
providing the at least one guide rail as at least one dovetail-shaped rail.

19. The method of claim 18, further comprising:
providing the driver board with two dovetail-shaped rails.

20. The method of claim 14, further comprising:
providing the impact tool with a slotted cap configured to fit over a drive end of the impact tool, and the slotted cap configured to fit over a portion of one end of the driver board.

* * * * *